UNITED STATES PATENT OFFICE.

JAMES CHURCHWARD, OF NEW YORK, N. Y.

QUENCHING-BATH FOR TREATING STEEL AND IRON.

No. 832,771. Specification of Letters Patent. Patented Oct. 9, 1906.

Application filed December 6, 1905. Serial No. 290,585.

*To all whom it may concern:*

Be it known that I, JAMES CHURCHWARD, a subject of the King of Great Britain, residing in the borough of Manhattan, n the city, county, and State of New York, have invented certain new and useful Improvements in Quenching-Baths for Treating Steel and Iron, of which the following is a specification.

In order to impart e pecial hardness to steel, it is the universal custom to heat it and then quench or cool it quickly in a bath consisting of water or oil; and the present invention relates to such a quenching-bath, the novel feature residing in the bath consisting of a phenol or phenol derivative mixed with an oil or other fatty material or substance.

In carrying out the invention a suitable proportion of a phenol, such as carbolic acid (phenol hydroxid) or creosote, (a monohydric phenol,) for example, with some fatty substance, such as glycerin (glycerol) or linseed-oil, for example, form the quenching-bath.

For steel heated up to about 1,700° to 1,800° Fahrenheit a bath composed as follows will produce good results: carbolic acid, fifty per cent.; linseed-oil, fifty per cent.; total, one hundred per cent.

The bath should be kept as cool as possible and the hot steel be immersed therein and allowed to remain in the bath until cold.

The proportions of the ingredients of the quenching-bath may be varied somewhat without departing from the spirit of the invention.

The words "fatty substance or material" as herein used are meant to include glycerin, oils of all kinds, and other substances containing the fatty acids.

The phenol, if used pure, causes such a sudden shock that the shrinkage and tightening of the outer skin of the metal causes the steel to crack. Therefore an oil or some fatty substance is mixed with the phenol to modify the effect. The oil or fat prevents the metal from cooling suddenly, so that the pores of the metal remain open for a very short period of time. During this period the pheno. penetrates and acts on the inner metal, thereby carrying the depths of hardening to any degree required.

Temperatures govern the action a great deal. A high temperature or a series of high temperatures will carry the hardening to the center of the metal; a low temperature will only carry in a short distance. The object is not to add carbon to the casting quenched, and the ingredients employed do not add an appreciable amount of carbon to the steel.

Having thus described my invention, I claim—

1. A quenching-bath for steel and iron consisting of a phenol and a fatty substance.
2. A quenching-bath for steel and iron, consisting of carbolic acid and a fatty substance.
3. A quenching-bath for steel and iron, consisting of a phenol and linseed-oil.
4. A quenching-bath for steel and iron, consisting of carbolic acid and linseed-oil.

In witness whereof I have hereunto signed my name, this 5th day of December, 1905, in the presence of two subscribing witnesses.

JAMES CHURCHWARD.

Witnesses:
 HENRY CONNETT,
 H. G. HOSE.